(12) United States Patent
Ramanathan et al.

(10) Patent No.: US 6,784,252 B2
(45) Date of Patent: Aug. 31, 2004

(54) BLOW MOLDABLE PROPYLENE POLYMER COMPOSITIONS

(75) Inventors: Ravi Ramanathan, Midland, MI (US); Thomas D. Traugott, Sanford, MI (US); Leo R. Novak, Lake Jackson, TX (US); Malcolm F. Finlayson, Houston, TX (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/233,981

(22) Filed: Sep. 3, 2002

(65) Prior Publication Data

US 2003/0069362 A1 Apr. 10, 2003

Related U.S. Application Data

(60) Provisional application No. 60/326,497, filed on Oct. 1, 2001.

(51) Int. Cl.$^7$ .............................................. C08L 23/12
(52) U.S. Cl. ........................ 525/240; 525/224; 524/451
(58) Field of Search .............................. 525/240, 333.9, 525/242; 524/451

(56) References Cited

U.S. PATENT DOCUMENTS

| | | | |
|---|---|---|---|
| 3,336,268 A | 8/1967 | Cox | 260/79.3 |
| 5,414,027 A | 5/1995 | DeNicola, Jr. et al. | 522/112 |
| 5,731,362 A | 3/1998 | Scheve et al. | 521/142 |
| 6,191,219 B1 * | 2/2001 | Tanaka et al. | 525/95 |
| 6,211,302 B1 | 4/2001 | Ho et al. | 525/333.5 |
| 6,331,597 B1 * | 12/2001 | Drumright et al. | 525/333.5 |
| 6,429,250 B1 * | 8/2002 | Rohrmann | 524/451 |
| 6,472,473 B1 * | 10/2002 | Ansems et al. | 525/191 |
| 6,593,005 B2 * | 7/2003 | Tau et al. | 428/516 |
| 2001/0000254 A1 * | 4/2001 | Tanaka et al. | 525/88 |

FOREIGN PATENT DOCUMENTS

| | | | |
|---|---|---|---|
| WO | WO 99/10415 | 3/1999 | |
| WO | WO 99/10424 | 3/1999 | |
| WO | WO 99/10424 A1 * | 3/1999 | C08K/5/43 |
| WO | WO 99/28381 | 6/1999 | |
| WO | WO 00/78858 | 12/2000 | |
| WO | WO 00/78858 A2 * | 12/2000 | C08L/23/00 |
| WO | WO 00/78861 A1 | 12/2000 | |

OTHER PUBLICATIONS

X. Wang, et al., Chemical Modification of Polypropylene with Peroxide/Pentaerythritol Triacrylate by Reactive Extrusion, Journal of Applied Polymer Science, vol. 61, Issue 8, (1996), pp. 1395–1404.

* cited by examiner

*Primary Examiner*—David W. Wu
*Assistant Examiner*—Rip A. Lee

(57) ABSTRACT

Disclosed are blow molded automotive articles comprising a coupled propylene polymer composition.

15 Claims, No Drawings

BLOW MOLDABLE PROPYLENE POLYMER COMPOSITIONS

CROSS REFERENCE STATEMENT

This application claims the benefit of U.S. Provisional Application No. 60/326,497, filed Oct. 1, 2001.

This invention relates to blow moldable propylene polymer compositions and fabricated articles thereof.

BACKGROUND OF THE INVENTION

Polypropylene has been used in many applications in the form of injection molded and extruded articles, film, sheet, etc., because it is excellent in molding processability, toughness, moisture resistance, gasoline resistance, chemical resistance, has a low specific gravity, and is inexpensive. Advances in impact modification have further expanded the versatility and uses of propylene polymers. The use of propylene polymers is expanding at an increasing rate in the fields of exterior and interior automotive trims, in electrical and electrical equipment device housings and covers as well as other household and personal articles.

Automotive articles are ordinarily processed by injection molding. However, there are many components of automobiles wherein such parts are hollow and to manufacture these by injection molding is very difficult and expensive. Many such parts, particularly large parts, can conceivably be made by blow molding provided the polymer has adequate processing properties such as high melt strength and end product properties such as toughness, especially low temperature toughness. It is known that commercially available propylene polymers for injection molding and extrusion have excellent properties, but lack a combination of good melt strength and toughness. Higher toughness and good melt strength are attributes of grades of propylene polymers with higher molecular weights, however, melt processing machine outputs tend to be inversely related to polymer molecular weights.

Attempts to modify the melt strength and toughness of propylene polymers include cross-linking or branching induced by non-selective chemistries involving free radicals using peroxides or high energy radiation. For the reaction of polypropylene with peroxides see Journal of Applied Polymer Science, Vol. 61, 1395–1404 (1996). However, this approach does not work well in actual practice as the rate of chain scission tends to dominate the limited amount of chain coupling that takes place. For radiation of polypropylene to produce long branches for producing polypropylene film see U.S. Pat. No. 5,414,027. Another method to improve melt strength of propylene polymers is taught in U.S. Pat. No. 3,336,268 wherein polypropylene is bridged with sulfonamide groups. However, no improvement was demonstrated in the ability to blow mold bridged and unbridged propylene polymers.

It would be desirable to have a tough propylene polymer composition with adequate melt strength suitable for blow molding, especially for blow molding large automotive parts.

SUMMARY OF THE INVENTION

It has now been found that propylene polymer compositions wherein the propylene polymer is coupled with the coupling agents according to the practice of the invention can be blow molded into automotive articles. Preferably the propylene polymer is an impact propylene copolymer. Preferably, the coupling agent is a bis(sufonyl azide).

Further, the coupled propylene polymer composition optionally comprises one or more of a polyolefin elastomer, a thermoplastic polymer or a filler.

The invention further involves a process to blow mold automotive articles from a coupled propylene polymer composition.

Preferably the automotive article is a seat back, a head rest, a knee bolster, glove box door, an instrument panel, a bumper facia, a bumper beam, a center console, an intake manifold, a spoiler, a side molding, a pillar, a door trim, an airbag cover, a HVAC duct, a spare tire cover, a fluid reservoir, a rear window shelf, a resonator, a trunk board or an arm rest.

DETAILED DESCRIPTION OF THE INVENTION

The blow molded automotive articles of the present invention are produced from a coupled propylene polymer composition. The coupled propylene polymer composition involves coupling of a propylene polymer using a coupling agent. The propylene polymer is a propylene homopolymer, preferably a propylene copolymer or most preferably an impact propylene copolymer.

The propylene polymer suitable for use in this invention is well known in the literature and can be prepared by various processes, for example, in a single stage or multiple stages, by such polymerization method as slurry polymerization, gas phase polymerization, bulk polymerization, solution polymerization or a combination thereof using a metallocene catalyst or a so-called Ziegler-Natta catalyst, which usually is one comprising a solid transition metal component comprising titanium. Particularly a catalyst consisting of, as a transition metal/solid component, a solid composition of titanium trichloride which contains as essential components titanium, magnesium and a halogen; as an organometalic component an organoaluminum compound; and if desired an electron donor. Preferred electron donors are organic compounds containing a nitrogen atom, a phosphorous atom, a sulfur atom, a silicon atom or a boron atom, and preferred are silicon compounds, ester compounds or ether compounds containing these atoms.

Propylene polymers are commonly made by catalytically reacting propylene in a polymerization reactor with appropriate molecular weight control agents. Nucleating agent may be added after the reaction is completed in order to promote crystal formation. The polymerization catalyst should have high activity and be capable of generating highly tactic polymer. The reactor system must be capable of removing the heat of polymerization from the reaction mass, so the temperature and pressure of the reaction can be controlled appropriately.

A good discussion of various polypropylene polymers is contained in Modern Plastics Encyclopedia/89, mid October 1988 Issue, Volume 65, Number 11, pp. 86–92, the entire disclosure of which is incorporated herein by reference. In general, the propylene polymer is in the isotactic form, although other forms can also be used (e.g., syndiotactic or atactic). The propylene polymer used for the present invention is a propylene homopolymer or a propylene copolymer of propylene and an alpha-olefin, preferably a $C_2$, or $C_4$ to $C_{20}$ alpha-olefin, for example, a random or block copolymer or preferably an impact propylene copolymer.

Examples of the $C_2$, and $C_4$ to $C_{20}$ alpha-olefins for constituting the propylene copolymer include ethylene, 1-butene, 1-pentene, 1-hexene, 1-heptene, 1-octene, 1-decene, 1-dodecene, 1-hexadodecene, 4-methyl-1- pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene and vinylnorbornene, where alkyl branching position is not specified it is generally on position 3 or higher of the alkene.

For random or block propylene copolymers, the alpha-olefin is present in an amount of not more than 15 weight percent, preferably not more than 12 weight percent, even more preferably not more than 9 weight percent and most preferably not more than 7 weight percent.

Impact propylene copolymers are commercially available and are well known within the skill in the art, for instance, as described by E. P. Moore, Jr in *Polypropylene Handbook*, Hanser Publishers, 1996, page 220–221 and U.S. Pat. Nos. 3,893,989 and 4,113,802. The term "impact propylene copolymer" is used herein to refer to heterophasic propylene copolymers where polypropylene is the continuous phase and an elastomeric phase is dispersed therein. Those of skill in the art recognize that this elastomeric phase may also contain crystalline regions, which for purposes of the current invention are considered part of the elastomeric phase. The impact propylene copolymer may be polypropylene and an elastomer physically blended, preferably the impact propylene copolymers result from an in-reactor process. Usually the impact propylene copolymers are formed in a dual or multi-stage process, which optionally involves a single reactor with at least two process stages taking place therein, or optionally multiple reactors.

The continuous phase of the impact propylene copolymer typically will be a propylene homopolymer or a random propylene copolymer, more typically a propylene homopolymer. The continuous phase of the impact propylene copolymer may be made using Ziegler-Natta catalyst, constrained geometry catalyst, metallocene catalyst, or any other suitable catalyst system. When the propylene polymer making up the continuous phase is a propylene homopolymer, the crystallinity of the propylene polymer, as determined by differential scanning calorimetry, is preferably equal to or greater than about 50 percent, more preferably equal to or greater than about 55 percent, most preferably equal to or greater than about 62 percent. The methods for determining percent crystallinity using a differential scanning calorimetry are known to one skilled in the art.

The elastomeric phase comprises propylene and one or more alpha olefins, preferably ethylene. The elastomeric phase may be made using constrained geometry catalyst, Ziegler-Natta catalyst, metallocene catalyst, or any other suitable catalyst.

When the continuous phase of the impact propylene copolymer is a propylene homopolymer and the elastomeric phase is comprised of a copolymer or terpolymer containing monomer units derived from ethylene, the impact propylene copolymer preferably contains an amount equal to or greater than about 5 weight percent, more preferably equal to or greater than about 7 weight percent, most preferably equal to or greater than about 9 weight percent —$CH_2CH_2$— units derived from ethylene based on the total weight of the impact propylene copolymer. Preferably, such an impact propylene copolymer contains less than about 30 weight percent, more preferably less than about 25 weight percent, most preferably less than about 20 weight percent —$CH_2CH_2$— units derived from ethylene monomer based on the total weight of the impact propylene copolymer.

Advantageously, the impact propylene copolymers used for the invention have an elastomeric phase in an amount equal to or greater than about 10 weight percent, preferably equal to or greater than about 15 weight percent, more preferably equal to or greater than about 20 weight percent based on the total weight of the impact propylene copolymer. Preferably, the elastomeric phase is less or equal to about 70 weight percent, more preferably less than or equal to about 40 weight percent, most preferably less than or equal to about 25 weight percent based on the total weight of the impact propylene copolymer.

The propylene polymer is employed in amounts equal to or greater than about 30 parts by weight, preferably equal to or greater then about 40 parts by weight, more preferably equal to or greater than about 50 parts by weight, even more preferably equal to or greater than about 60 parts by weight and most preferably equal to or greater than about 70 parts by weight based on the weight of the coupled propylene polymer composition. In general, the propylene polymer is used in amounts less than or equal to about 100 parts by weight, preferably less than or equal to about 95 parts by weight, more preferably less than or equal to about 90 parts by weight, even more preferably less than or equal to about 85 parts by weight and most preferably less than or equal to 80 parts by weight based on the weight of the coupled propylene polymer composition.

For the purpose of coupling, the propylene polymer is reacted with a polyfunctional compound which is capable of insertion reactions into carbon-hydrogen bonds. Compounds having at least two functional groups capable of insertion into the carbon-hydrogen bonds of CH, $CH_2$, or $CH_3$ groups, both aliphatic and aromatic, of a polymer chain are referred to herein as coupling agents. Those skilled in the art are familiar with carbon-hydrogen insertion reactions and functional groups capable of such reactions, for instance carbenes and nitrenes. Examples of chemical compounds that contain a reactive group capable of forming a carbene group include, for example, diazo alkanes, geminally-substituted methylene groups, and metallocarbenes. Examples of chemical compounds that contain reactive groups capable of forming nitrene groups, include, but are not limited to, for example, alkyl and aryl azides (R—$N_3$), acyl azides (R—C(O)$N_3$), azidoformates (R—O—C(O)—$N_3$), sulfonyl azides (R—$SO_2$—$N_3$), phosphoryl azides ((RO)$_2$—(PO)—$N_3$), phosphinic azides ($R_2$—P(O)—$N_3$) and silyl azides ($R_3$—Si—$N_3$). It may be necessary to activate a coupling agent with heat, sonic energy, radiation or other chemical activating energy, for the coupling agent to be effective for coupling propylene polymer chains.

The preferred coupling agent is a sulfonyl azide, more preferably a bis(sulfonyl azide). Examples of sulfonyl azides useful for the invention are described in WO 99/10424. Sulfonyl azides include such compounds as 1,5-pentane bis(sulfonyl azide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl)hexane, 2,7-naphthalene bis(sulfonyl azide), and mixed sulfonyl azides of chlorinated aliphatic hydrocarbons containing an average of from 1 to 8 chlorine atoms and from 2 to 5 sulfonyl azide groups per molecule, and mixtures thereof. Preferred sulfonyl azides include 4,4' oxy-bis-(sulfonylazido)benzene, 2,7-naphthalene bis(sulfonyl azido), 4,4'-bis(sulfonyl azido)biphenyl, 4,4'- diphenyl ether bis(sulfonyl azide) and bis(4-sulfonyl azidophenyl)methane, and mixtures thereof.

Sulfonyl azides are commercially available or are conveniently prepared by the reaction of sodium azide with the corresponding sulfonyl chloride, although oxidation of sulfonyl hydrazines with various reagents (nitrous acid, dinitrogen tetroxide, nitrosonium tetrafluoroborate) has been used.

One skilled in the art knows that an effective amount of coupling agent is dependent on the coupling agent selected and the average molecular weight of the propylene polymer. Typically, the lower the molecular weight of the propylene polymer, the more coupling agent needed. An effective amount of coupling agent is an amount sufficient to result in adequate melt strength for blow molding, but less than a cross-linking amount, that is an amount sufficient to result in less than about 10 weight percent gel in the coupled propylene polymer as measured by ASTM D2765-procedure A. When a sulfonyl azide is used as a coupling agent, generally, an effective amount is equal to or greater than about 50 parts per million (ppm), preferably equal to or greater than about 75 ppm, more preferably equal to or greater than about 100 ppm and most preferably equal to or greater than 150 ppm by weight based on the weight of the propylene polymer. Formation of cross-linked propylene polymer is to be avoided, therefore the amount of bis (sulfonyl azide) is limited to equal to or less than 2000 ppm, preferably equal to or less than 1500 ppm and more preferably equal to or less than 1300 ppm by weight based on the weight of the propylene polymer.

Optionally, the propylene polymer compositions of the present invention may comprise an elastomer. Elastomers are defined as materials which experience large reversible deformations under relatively low stress. Elastomers are typically characterized as having structural irregularities, non-polar structures, or flexible units in the polymer chain. Preferably, an elastomeric polymer can be stretched to at least twice its relaxed length with stress and after release of the stress returns to approximately the original dimensions and shape. Some examples of commercially available elastomers include natural rubber, polyolefin elastomers (POE), chlorinated polyethylene (CPE), silicone rubber, styrene/butadiene (SB) copolymers, styrene/butadiene/styrene (SBS) terpolymers, styrene/ethylene/butadiene/styrene (SEBS) terpolymers and hydrogenated SBS or SEBS.

Preferred elastomers are polyolefin elastomers. Suitable polyolefin elastomers for use in the present invention comprise one or more $C_2$ to $C_{20}$ alpha-olefins in polymerized form, having a glass transition temperature ($T_g$) less than 25° C., preferably less than 0° C. $T_g$ is the temperature or temperature range at which a polymeric material shows an abrupt change in its physical properties, including, for example, mechanical strength. $T_g$ can be determined by differential scanning calorimetry. Examples of the types of polymers from which the present polyolefin elastomers are selected include polyethylene and copolymers of alpha-olefins, such as ethylene and propylene (EPM), ethylene and 1-butene, ethylene and 1-hexene or ethylene and 1-octene copolymers, and terpolymers of ethylene, propylene and a diene comonomer such as hexadiene or ethylidene norbornene (EPDM) and ethylene, propylene and a $C_4$ to $C_{20}$ alpha-olefin.

A preferred polyolefin elastomer is one or more substantially linear ethylene polymer or one or more linear ethylene polymer (S/LEP), or a mixture of one or more of each. Both substantially linear ethylene polymers and linear ethylene polymers are well known. Substantially linear ethylene polymers and their method of preparation are fully described in U.S. Pat. No. 5,272,236 and U.S. Pat. No. 5,278,272 and linear ethylene polymers and their method of preparation are fully disclosed in U.S. Pat. No. 3,645,992; U.S. Pat. No. 4,937,299; U.S. Pat. No. 4,701,432; U.S. Pat. No. 4,937,301; U.S. Pat. No. 4,935,397; U.S. Pat. No. 5,055,438; EP 129,368; EP 260,999; and WO 90/07526 the disclosures of which are incorporated herein by reference.

If present, the elastomer is employed in amounts of equal to or greater than about 5 parts by weight, preferably equal to or greater than about 10 parts by weight, more preferably equal to or greater than about 15 parts by weight and most preferably equal to or greater than about 20 parts by weight based on the weight of the coupled propylene polymer composition. In general, the elastomer is used in amounts less than or equal to about 70 parts by weight, preferably less than or equal to about 60 parts by weight, more preferably less than or equal to about 50 parts by weight, even more preferably less than or equal to about 40 parts by weight and most preferably 30 parts by weight based on the weight of the coupled propylene polymer composition.

Optionally, one or more additional thermoplastic polymer may be blended with the coupled propylene polymer provided the desired blow molding properties in the resulting coupled propylene polymer composition are achieved. Examples of additional thermoplastic polymers include any of the coupled or uncoupled propylene polymers described above for this invention; functionalized polypropylene, such as maleated polypropylene or polypropylene with carboxylic acid moieties; polyethylene, such as high density polyethylene (HDPE), low density polyethylene (LDPE), linear low density polyethylene (LLDPE), ultra low density polyethylenes (ULDPE) and very low density polyethylene (VLDPE); interpolymers of ethylene with a vinyl aromatic, such as styrene; ethylene-vinyl acetate copolymer (EVA), ethylene-ethyl acetate copolymer (EEA), ethylene acrylic acid (EAA), polyethylene graft maleic anhydride (PE-g-MAH), polystyrene; polycyclohexylethane; polyesters, such as polyethylene terephthalate; syndiotatic polypropylene; syndiotactic polystyrene; polyamides; and mixtures thereof.

If present, the additional thermoplastic polymer is employed in amounts equal to or greater than about 5 parts by weight, preferably equal to or greater than about 10 parts by weight, more preferably equal to or greater than about 15 parts by weight and most preferably equal to or greater than about 20 parts by weight based on the weight of the coupled propylene polymer composition. In general, the additional polymer is used in amounts less than or equal to about 70 parts by weight, preferably less than or equal to about 60 parts by weight, more preferably less than or equal to about 50 parts by weight, even more preferably less than or equal to about 40 parts by weight and most preferably 30 parts by weight based on the weight of the coupled propylene polymer composition.

Optionally, the propylene polymer compositions of the present invention may further comprise mineral fillers such as calcium carbonate, talc, clay, mica, wollastonite, hollow glass beads, titaninum oxide, silica, carbon black, glass fiber or potassium titanate. Preferred fillers are talc, wollastonite, clay, cation exchanging layered silicate material or mixtures thereof. Talcs, wollastonites, and clays are generally known fillers for various polymeric resins. See for example U.S. Pat. No. 5,091,461 and U.S. Pat. No. 3,424,703; EP 639,613 A1; and EP 391,413, where these materials and their suitability as filler for polymeric resins are generally described.

Examples of preferred cation exchanging layered silicate materials, sometimes referred to as nanofillers, include biophilite, kaolinite, dickalite or talc clays; smectite clays; vermiculite clays; mica; brittle mica; fluoromica; Sepiolite; Magadiite; Kenyaite; Octosilicate; Kanemite; and Makatite. Preferred cation exchanging layered silicate materials are smectite clays, including montmorillonite, bidelite, saponite and hectorite.

The desired amount of filler will depend on the filler, the propylene polymer and the application, but usually, the filler is employed in an amount equal to or greater than about 0.01 parts by weight, preferably equal to or greater than about 0.1 parts by weight, more preferably equal to or greater than about 1 parts by weight, even more preferably equal to or greater than about 5 parts by weight, and most preferably equal to or greater than about 10 parts by weight based on the total weight of the coupled propylene polymer composition. Usually it has been found sufficient to employ an amount of filler equal to or less than about 50 parts by weight, preferably equal to or less then about 40 parts by weight, more preferably equal to or less than about 30 parts by weight, more preferably equal to or less than about 25 parts by weight, more preferably up to and including about 20 parts by weight, and most preferably up to and including about 15 parts by weight based the weight of the coupled propylene polymer composition.

Additionally, it is believed that in some instances nucleating agents and/or clarifying agents may preferably be utilized with the practice of the invention. Examples of nucleating agents include metal salts of an aromatic or aliphatic carboxylic acid, such as aluminum benzoate, sodium benzoate, aluminum p-t-butylbenzoate, sodium adipate, sodium thiophenecarboxylate and sodium pyrrolecarboxylate. Metal salts of an organic phosphoric acid are also preferred as the nucleating agent. Additional nucleating agents and their use are fully described in U.S. Pat. No. 6,153,715 which is incorporated herein by reference.

Various additives are optionally incorporated in the coupled propylene polymer composition such as, pigments, antioxidants, acid scavengers, ultraviolet absorbers, neutralizers, slip agents, antiblock agents, antistatic agents, clarifiers, waxes, flame retardants, processing aids, extrusion aids, and other additives within the skill in the art used in combination or alone. Effective amounts are known in the art and depend on parameters of the composition and conditions to which they are exposed.

The coupling reaction is implemented via reactive extrusion or any other method which is capable of mixing the coupling agent with the propylene polymer and adding sufficient energy to cause a coupling reaction between the coupling agent and the propylene polymer. Preferably, the process is carried out in a single vessel such as a melt mixer or a polymer extruder, such as described in U.S. patent application Ser. No. 09/133,576 filed Aug. 13, 1998 which is incorporated by reference herein in its entity. The term extruder is intended to include its broadest meaning and includes such devices as a device which extrudes pellets as well as an extruder which produces the extrudate for forming into blow molded articles.

The reaction vessel preferably has at least two zones capable of different temperatures into which a reaction mixture would pass, the first zone advantageously being at a temperature at least the softening temperature of the propylene polymer and preferably less than the decomposition temperature of the sulfonyl azide and the second zone being at a temperature, sometimes referred to as melt process temperature, sufficient for decomposition of the sulfonyl azide. The first zone is preferably at a temperature sufficiently high to soften the propylene polymer and allow it to combine with the sulfonyl azide through distributive mixing, preferably to a substantially uniform admixture. Preferably, the propylene polymer admixture comprising the sulfonyl azide is exposed to a profile of temperature in the first zone ranging from about 50° C. to about 220° C., preferably about 160° C. to about 200° C. and the melt process temperature in the second zone is from about 200° C. to about 285° C., preferably from about 220° C. to about 255° C.

A blow molded article of the present invention may be manufactured by blow molding the abovementioned coupled propylene polymer composition through the use of a conventional blow molding machine, preferably an extrusion blow molding machine, employing conventional conditions. For example, in the case of extrusion blow molding, the resin temperature is less than or equal to about 240° C., preferably less than or equal to about 230° C. and more preferably less than or equal to about 220° C. Further, the resin temperature is greater than or equal to about 190° C., preferably greater than or equal to about 200° C. and more preferably greater than or equal to about 210° C. The above mentioned coupled propylene polymer composition having a proper temperature is extruded through a die in the form of a molten tube-shaped parison. Next the parison is held within a shaping mold. Subsequently a gas, preferably air, nitrogen or carbon dioxide, is blown into the mold so as to shape the parison according to the profile of the mold, yielding a hollow molded automotive article. Examples of blow molded automotive articles are a seat back, a head rest, a knee bolster, glove box door, an instrument panel, a bumper facia, a bumper beam, a center console, an intake manifold, a spoiler, a side molding, a pillar, a door trim, an airbag cover, a HVAC duct, a spare tire cover, a fluid reservoir, a rear window shelf, a resonator, a trunk board or an arm rest.

Alternatively, the coupling can be carried out in an extruder which also forms the blow molded article, e.g., in a blow molding machine preferably an extrusion blow molding machine. The propylene polymer, a coupling amount of a sulfonyl azide and optionally additional components are introduced into the blow molding machine to form a propylene polymer admixture. The admixture is exposed to a melt process temperature, sufficient to result in the coupling of the propylene polymer forming a molten, coupled propylene polymer composition. The molten, coupled propylene polymer composition is extruded into a molten tube-shaped parison and the formation of a blow molded article is the same as described hereinabove.

Adequate polymer melt strength is necessary for producing acceptable blow molded articles, especially large blow molded articles such as automotive articles. If the polymer's melt strength is too low, the weight of the parison can cause elongation of the parison causing problems such as variable wall thickness and weight in the blow molded article, part blow-out, neck down and the like. Too high of a melt strength can result in rough parisons, insufficient blowing, excessive cycle times and the like. Polymer "swell" is a useful property to describe adequate polymer melt strength. Swell is the ratio of the diameter of the parison (at a specific point, or distance, from the die) to the diameter of the die. Maximum swell ratio is determined at the point on the parison where the greatest diameter swell is achieved. Preferably maximum swell ratios are between 1 to about 2, more preferably between about 1.2 to about 1.8. Minimum swell ratio is determined at the point on the parison where the smallest diameter swell is achieved. Preferably minimum swell ratios are equal to or greater than about 0.5 to less than or equal to 1, more preferably equal to or greater than about 0.75 to less than or equal to 1. A useful method for measuring and calculating swell is from video images, preferably digital video images, of the parison as it forms.

Another useful parameter for describing the melt strength of a polymer is "sag". Sag is the ratio of the maximum swell ratio to the minimum swell ratio. Polymers that demonstrate adequate melt strength and good blow moldability generally have a sag value between about 1 to about 4, more preferably about 1.3 to about 3.5 and most preferably about 1.5 to about 3.

"Blow-up ratio" ("BUR"), sometimes referred to as draw ratio, is yet another useful parameter to describe the melt strength or blow moldability of a polymer. BUR is the ratio of the diameter of the parison to the maximum diameter, depth or width of the blow molded article. Preferred BUR values are between about 1.5 to about 5.

EXAMPLES

The compositions of Comparative Example A and Examples 1 to 3 are compounded on a Farrel Continuous Mixer CP 250 having a mixing section and an extruding section. The following are the compounding conditions for the mixing section: Barrel temperature profile: 100° C., 200° C. and 220° C.; Die temperature: 270° C.; Melt temperature: 190 to 230° C.; and Screw speed: 450 revolutions per minute (rpm). The extrudate from the continuous mixer is fed directly into the throat of the single screw extruder having a screw length/diameter of 11:1, a compression ratio of 3:1 and revolutions per minute (RPM) of 100. The extruder section operated under the following temperatures: Barrel rear and forward 218° C.; Adapter: 218° C. and Die: 218° C.

The extrudate from the single screw extruder is cooled in the form of strands and comminuted in a strand chopper as pellets. The pellets are used to blow mold test parts used to determine physical properties, swell, sag and BUR and to blow mold an automotive seat back.

The formulation content of Comparative Example A and Examples 1 to 3 is given in Table 1 below in parts by weight of the total composition. In Table 1:

"PP 1" is a coupled impact copolymer polypropylene wherein an impact copolymer propylene comprising about 27 percent ethylene/propylene rubber having a density of about 0.9 g/cm³ measured according to ASTM D 1505 and a melt flow rate of about 0.8 g per 10 minutes (g/10 min.), determined according to ASTM D 1238L at 230° C. and an applied load of 2.16 kg is used as the base resin. The base resin, about 2000 parts per million (ppm) IRGANOX™ 1010 (phenolic antioxidant commercially available from Ciba Geigy) and about 150 parts per million 4,4' oxy-bis-(sulfonylazido)benzene are feed into a Werner and Pfleiderer ZSK40 twin screw extruder at a feed rate of 250 pounds per hour, a screw speed of 300 rpm and with a target temperature profile of 180/190/200/200/210/220/230/240/230/240/240° C. (from feed inlet to die). The extrudate is comminuted to pellets as the coupled impact copolymer propylene PP-1.

PP-1 comprises about 11 percent ethylene having a density of about 0.9 g/cm³, a melt flow rate of about 0.4 g/10 min. and a crystallinity of about 62 weight percent as determined on a TA Instrument 2910 DSC apparatus by the following procedure: A small sample (milligram size) of the propylene polymer is sealed into an aluminum DSC pan. The sample is placed into a DSC cell with a 25 centimeter per minute nitrogen purge and cooled to about −100° C. A standard thermal history is established for the sample by heating at 10° C. per minute to 225° C. The sample is then cooled to about −100° C. and reheated at 10° C. per minute to 225° C. The observed heat of fusion ($\Delta H_{observed}$) for the second scan is recorded. The observed heat of fusion is related to the degree of crystallinity in weight percent based on the weight of the polypropylene sample by the following equation:

$$\text{Crystallinity } \% = \frac{\Delta H_{observed}}{\Delta H_{isotactic\ PP}} \times 100$$

where the heat of fusion for isotactic polypropylene ($\Delta H_{isotactic\ PP}$), as reported in B. Wunderlich, Macromolecular Physics, Volume 3, Crystal Melting, Academic Press, New Your, 1980, p 48, is 165 Joules per gram (J/g) of polymer. The standard thermal history is established by allowing the sample to cool from 225° C. to room temperature and then cooling the sample from room temperature to −100° C. with liquid nitrogen;

"PP-2" is a propylene homopolymer having a density of 0.91 g/cm³ measured according to ASTM D 1505 and a melt flow rate of 2 g/10 min., determined according to ASTM D 1238L at 230° C. and an applied load of 2.16 kg;

"PP-3" is a propylene copolymer having a density of 0.9 g/cm³ measured according to ASTM D 1505 and a melt flow rate of 0.8 g/10 min., determined according to ASTM D 1238L at 230° C. and an applied load of 2.16 kg;

"S/LEP" is a substantially linear ethylene/octene copolymer available as AFFINITY™ EG 8150 from The Dow Chemical Company having a density of approximately 0.868 g/cm³, a melt flow rate of 0.5 g/10 min. determined according to ASTM D 1238 at 190° C. and an applied load of 2.16 kg, and a CBDI of greater than 50;

"TALC" is commercially available as Jetfil 700C from Luzenac America having a median particle size of 1.5 microns.

Swell, sag and BUR of the coupled propylene polymer composition are determined on a Bekum model BM-502S extrusion blow molding machine and are reported in Table 1. The BM-502S machine barrel temperature profile is set at 180° C., 200° C., 220° C., and 230° C., the transfer line temperatures are set at 230° C. and the head temperatures are set at 230° C. giving a melt temperature of 230° C. A diverging head tool having a nominal 1.1 inch diameter is fed by the extruder. The polymer through-put is 30 pounds per hour, the die gap is 25 percent of full scale, no parison programming is invoked and the extruding parison is captured on digital video tape and recorded in inches for swell and sag analysis. Swell and sag is determined on a 48 inch parison. BUR is determined on a mold comprising, sequentially, a 3 inch long cylindrical tube having a diameter of 1.1 inch, followed by a 3.3 inch diameter sphere, followed by a 2 inch long cylindrical tube having a diameter of 1.65 inches and finally followed by a 5 inch sphere. The mold has a single blow pin which delivers 60 to 80 pounds per square inch of air pressure inside the parison.

Physical properties are measured on test specimens injection molded on a DEMAG D100 NC111 injection molding machine. The samples are dried in an oven for four hours at 80° C. prior to injection molding. Injection molding conditions are: Feed temperature: 21° C.; Barrel temperatures: zone 1: 207° C., zone 2: 218° C., zone 3: 21° C. and zone 4: 207° C.; Mold temperature 218° C.; Cycle time: 48 seconds (sec.); Hold time: 19 sec.; and Cool time: 31 sec.

The following physical property tests are run on Comparative Example A and Examples 1 to 3 and the results of these tests are shown in Table 1:

"Flexural Modulus" is determined in accordance with ASTM D 790. Testing is performed using a Series 9 Automated Testing System, Model 4501 mechanical tester. Results are reported in $10^5$ pounds per square inch ($10^5$ psi);

"Percent Elongation" is done in accordance with ASTM D 638M-89. Testing is performed using a Series 9 Automated Testing System, Model 4501 mechanical tester. Results are reported in percent (%); and "Notched Izod" is determined according to ASTM D 256 at 23° C. and 0° C. Specimens were cut from rectangular 0.5 inch by 5 inch bars measuring 0.125 inches in thickness. The specimens are notched with a notcher to give a 0.100 inch ±0.002 inch radius notch. A standard Izod impact testing unit equipped with a cold temperature chamber and a 10 foot-pound (ft-lb) free falling hammer is used. Results are reported in foot-pounds per inch (ft-lb/in).

Comparative Example A and Examples 1 and 2 are blow molded into an automotive rear seat back on a Sterling blow molding machine having a 20 pound accumulator head with a 15 inch diverging die. The blow molded automotive rear seat back is a 60/40 split rear seat back comprising a set of parts: a larger seat back section ("60") and a smaller seat back section ("40"). Both rear seat back sections are molded during a single cycle of the Sterling blow molding machine. The mold design incorporated 5 blow needles and air is used to inflate the parts. The barrel temperature profile is 190° C., 200° C., 230° C., 230° C., and 230° C. to give a melt temperature at the head of 230° C. The mold temperature is 15° C. and the cycle time is 200 seconds for each set of seat backs produced. The larger seat back section measures 28 inches×24 inches×1.5 inches and weighs about 8 pounds. The smaller seat back section measures 16 inches×24 inches×1.5 inches and weighs about 5 pounds.

The blow molded seat backs are subjected to the following test and results are reported in Table 1:

"ECE 17" is an European government accelerating load impact test standard for motor vehicles and is incorporated by reference herein. The test is run at room temperature. Results are reported as to whether the seat back shattered upon impact.

As can be seen from the data in Table 1, compositions of the present invention demonstrate a good balance of physical properties, impact properties and blow molding properties.

TABLE 1

|  | Example | | | Comparative Example A |
|---|---|---|---|---|
|  | 1 | 2 | 3 |  |
| COMPOSITION | | | | |
| PP-1 | 32 | 100 | 90 |  |
| PP-2 | 48 |  |  |  |
| PP-3 |  |  |  | 100 |
| S/LEP | 5 |  |  |  |
| TALC | 15 |  | 10 |  |
| PROPERTIES | | | | |
| Swell Ratio$_{max}$ | 1.36 | 1.78 | 1.54 | 1.50 |
| Sag | 2.00 | 2.05 | 1.75 | 2.08 |
| BUR | 3:1 | 5:1 | 3:1 | 5:1 |
| Flex Modulus, $10^5$ psi | 3.26 | 1.58 | 2.42 | 1.66 |
| Elongation, percent | 148 | 480 | 202 |  |
| Notched Izod, ft–lb/in | | | | |
| 23° C. | 3.4 | 18 | 5.6 | 12.2 |
| 0° C. |  | 11 | 2.4 | 3.7 |
| ECE17, part shatters | yes | no |  | yes |

What is claimed is:

1. A blow molded automotive article comprising a coupled propylene polymer composition comprising a coupled propylene polymer, a substantially linear ethylene polymer and/or a linear ethylene polymer and optionally a thermoplastic polymer and/or a filler.

2. The article of claim 1, wherein the coupled propylene polymer is formed by a reaction of a coupling agent with a propylene polymer.

3. The article of claim 2 wherein the coupling agent is a sulfonyl azide.

4. The article of claim 3 wherein the sulfonyl azide is 4,4'-diphenyl ether bis(sulfonyl azide).

5. The article of claim 2 wherein the propylene polymer is an impact propylene copolymer.

6. The article of claim 1 or 5 wherein the coupled propylene polymer composition further comprises a thermoplastic polymer.

7. The article of claim 6 wherein the thermoplastic polymer is high crystalline polypropylene homopolymer, polyethylene, ethylene-vinyl acetate copolymer, ethylene-ethyl acetate copolymer or ethylene acrylic acid.

8. The article of claim 1 or 5 wherein the coupled propylene polymer composition further comprises a filler.

9. The article of claim 8 wherein the filler is talc.

10. The article of claim 5 wherein the coupled propylene polymer composition further comprises a thermoplastic polymer and a filler.

11. The article of claim 10 wherein the thermoplastic polymer is a high crystalline polypropylene homopolymer and the filler is talc.

12. The article of claim 1, 5 or 10 is a seat back, a head rest, a knee bolster, glove box door, an instrument panel, a bumper fascia, a bumper beam, a center console, an intake manifold, a spoiler, a side molding, a pillar, a door trim, an airbag cover, a HVAC duct, a spare tire cover, a fluid reservoir, a rear window shelf, a resonator, a trunk board or an arm rest.

13. A process for blow molding a coupled propylene polymer composition into an automotive article comprising the steps of:
  i extruding a coupled propylene polymer comprising a coupled propylene polymer, a substantially linear ethylene polymer and/or a linear ethylene polymer and optionally a thermoplastic polymer and/or a filler in an extruder through a die,
  ii forming a molten tube-shaped parison,
  iii holding the parison within a shaping mold,
  iv blowing a gas into the mold so as to shape the parison according to the profile of the mold and
  v yielding a blow molded automotive article.

14. The process of claim 13 wherein the propylene polymer coupling reaction takes place in the same extruder that produces the article.

15. The process of claim 13 or 14 wherein the article is a seat back, a head rest, a knee bolster, glove box door, an instrument panel, a bumper fascia, a bumper beam, a center console, an intake manifold, a spoiler, a side molding, a pillar, a door trim, an airbag cover, a HVAC duct, a spare tire cover, a fluid reservoir, a rear window shelf, a resonator, a trunk board or an arm rest.

* * * * *